United States Patent Office 3,301,835
Patented Jan. 31, 1967

3,301,835
AMIDE-CURED CARBOXYL-CONTAINING POLYMERS
Nathaniel L. Watkins, Jr., White Bear Lake, Minn., and Richard M. McCurdy, Northridge, Calif., assignors to Minnesota Mining and Manufacturing Company, St. Paul, Minn., a corporation of Delaware
No Drawing. Filed Jan. 11, 1965, Ser. No. 424,824
The portion of the term of the patent subsequent to May 4, 1982, has been disclaimed
8 Claims. (Cl. 260—82.1)

This application is a continuation-in-part of our prior copending application S.N. 803,577 filed April 2, 1959, now Patent No. 3,182,040.

This invention relates to resinous compositions and more particularly to polymers cured by means of certain polyfunctional amide-containing monomers.

Processes for converting liquid polymers to solid elastomers or rubbers are of course well known. The elastomeric properties of polymers depend essentially upon the "backbone" of the system and upon the molecular weight. In order to assure adequate strength and elongation in a rubber, it appears to be essential that the curing of the liquid polymer which forms the starting material for the preparation of that rubber be accomplished chiefly by the method of chain-extension rather than by random crosslinking. This is true because the chain-extension method connects reactive end groups together, thus increasing primary molecular weight and creating a larger regular molecule composed of smaller units. In random crosslinking, however, the units in the final polymer molecule are not so regularly spaced and contain many loose ends (not terminally connected) which plasticize the molecule rather than add to its strength. On the other hand, bringing about polymerization of liquid polymers by the method of chain-extension preserves the essential elastomeric character of the final polymer and enables great strength and a high degree of elongation to be "built into" the resulting polymer.

Heretofore, three types of rubber have been produced from liquid prepolymers by the method of chain-extension. These substances include the polysulfide elastomers, polyesters and polyethers cured with diisocyanates, and carboxyl-terminated polyesters which have been chain-extended with diepoxide resins. Generally speaking, however, all three types of elastomers and the methods for their preparation have inherent disadvantages. Thus, for example, the polysulfide rubbers are relatively unstable with respect to their mechanical properties, particularly at elevated temperatures. Systems cured with isocyanates are sensitive to moisture during preparation and in addition, the isocyanate components have very irritating physiological effects. During curing, the formation of gas and consequent sponging of the composition is commonly observed and is obviously disadvantageous. The resulting rubbers soften severely at elevated temperatures and have very poor adhesion to metals when cured. Polyester resin chain-extensions with diepoxide resins require relatively long curing times at elevated temperatures and the resulting rubbers are rather stiff with poor elastomeric properties.

In spite of all of the shortcomings of the systems named and because of the great need for liquid elastomers which can be cured to produce dense solvent-proof masses with moderate strength and extensibility, desirably within a period of from about one to four days after application, such substances have found considerable use in the past, particularly in the field of sealants in the construction of aircraft.

It is an object of the invention to provide liquid compositions capable of forming elastomers, which can be cured at low temperatures and which when cured produce elastomers having superior heat stability and solvent resistance together with good flexibility at low temperature. Another object of the invention is to provide fabric-coating compositions. Further objects of the invention will be apparent from the disclosure hereinafter made.

In accordance with the above and other objects of the invention it has been found that when certain polycarboxyl group-containing prepolymers are cured with the hereinafter defined polyfunctional ethylenimine derivatives, elastomers are produced which have highly advantageous properties. They have a high degree of heat stability while retaining desirable mechanical and chemical properties at high temperature. They have excellent solvent resistance and are very flexible at low temperatures. They are relatively insensitive to moisture and can in most instances be mixed and compounded in simple, open mixing equipment rather than closed containers and ball mills; and they may be cast in inexpensive open molds, rather than high pressure and/or high temperature molds. When thus cast, they may be cured at surprisingly low temperatures, often at room temperature and when so cured, they are remarkably free from gas formation; yet they have useful pot life in spite of their low temperature curing properties. No significant toxicity problem appears to arise in connection with their production. The systems are characterized further by requiring no solvents, so that they can be prepared as mixtures containing 100% solids-forming components. When coated on fabrics, paper and leather for such uses as in lightweight tarpaulins, radomes, electrical insulation, collapsible storage and shipping containers, protective clothing and shoes, upholstery, etc., they form tough, flexible coatings which are superior to the presently used neoprene and vinyl fabric coatings in both low temperature flexibility and in abrasion resistance.

Prepolymers which are suitable for use in the present invention are the carboxyl-containing vinyl type polymers, including the acrylic addition copolymers. Some examples are copolymers of: acrylic acid and butadiene; a partially hydrolyzed copolymer of maleic anhydride and butyl acrylate; butyl acrylate, 2-cyanoethyl acrylate and acrylic acid; methacrylic acid and butadiene; acrylic acid and isoprene; acrylic acid and chloroprene; methacrylic acid and isoprene; cinnamic acid and butadiene; crotonic acid and butadiene; acrylic acid and methoxyethyl acrylate; and acrylic acid, acrylonitrile and butadiene.

The carboxyl group containing prepolymers which are cured by the method of the invention are further characterized by being substantially liquid at about 25° to 50° C. when devoid of volatiles (i.e. have a maximum viscosity of the order of about 10,000 poises at 25° C.), have an acid content ranging from about 0.1 to about 3 milli-equivalents per gram, and contain an average of more than 2 carboxyl groups per molecule. It is preferable that these carboxyl group containing prepolymers have viscosities of less than 1,000 poises at 25° C., acid contents of from about 0.25 to about 1.5 milli-equivalents per gram, contain an average of from 2.5 to about 15 carboxyl groups per prepolymer molecule and have a number average molecular weight ($\overline{M}_n$) of between about 700 and 10,000. While they may contain free hydroxyl groups, the presence of such hydroxyl groups in the prepolymers is in general detrimental for the purposes of the invention because they can undergo ester interchange reactions, causing a chemical stress relaxation in the cured rubber. The prepolymers used are substantially free from unreacted hydroxyl groups.

As noted, the prepolymers of the present invention are ordinarily liquid, 100% solids forming resins of which the maximum viscosity is of the order of 10,000 poises at 25° C. (less than 1,000 poises preferred). The advantages of such limitations on the prepolymer are:

(1) Little or no shrinkage upon final curing.

(2) The liquid form of these polymers is important in compounding and molding, i.e. simple mixing equipment may in most instances be used in place of ball mills and simple open molds may be used in place of high pressure and/or high temperature molds.

(3) The liquid form of the prepolymers makes it more simple to disperse the curing agent into the polymer itself. Bis-amides of the invention are soluble in or can be dispersed in the prepolymers. It is also possible when desired to put solid bis-amide curing agents into solution with volatile solvents such as chloroform and mix this solution with the prepolymer. The solvent may then be removed as by evaporation.

(4) No gases are given off during curing, whereby bubble-free resins are obtained.

(5) Strong, solvent-resistant rubbers can be formed in situ in difficultly accessible spaces, and the like.

The level of the acid concentration of the prepolymer as specified is limited to from between 0.1 and 3.0 milli-equivalents per gram (the preferred range being 0.25 to 1.5 milli-equivalents per gram), because the rate of the reaction between the prepolymer and the curing agent depends upon the concentration of free carboxyl groups available. For example, in certain applications, a curing time of about 2 to 4 days is most desirable. A level of fewer than 0.1 milli-equivalents per gram acid concentration is practically inoperative to produce the desired result. On the other hand, if the upper acid concentration limit of 3.0 milli-equivalents per gram is exceeded, control of the reaction may be lost, resulting in over heating, charring, and even fire. The higher acid concentrations also reduce pot life or working time to an unfeasible minimum.

When referring herein to "carboxyl," "carboxyl groups" or "free carboxyl groups," it is intended to mean free carboxylic acid reactive groups.

The individual molecules of liquid prepolymer must, as stated, contain an average of more than two free carboxyl groups and may contain up to about fifteen carboxyls per molecule. By including more than two free carboxyl groups per chain length, a cured composition is produced, which no longer is capable of viscous flow. The presence of more than fifteen carboxyl groups in the prepolymer molecule unduly shortens the pot life or working time after the curing agent is added. The term "a cured polymer" as used herein implies that the system under discussion falls within the gelation equation concept of Flory ("The Principles of Polymer Chemistry," P. J. Flory, Cornell Press, Ithaca, N.Y., 1953, pages 347 to 397).

The polyfunctional ethylenimine derivatives used to cure the carboxyl containing prepolymers of the invention are the substituted poly-N-alkylenamides represented by the following illustrative formula:

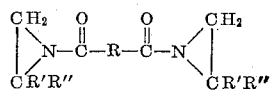

in which R represents an organic radical, such as an alkylene radical having from 4 to 40 carbon atoms, a 1,3-phenylene radical or a 1,4-phenylene radical; and R' and R" each represent hydrogen or an alkyl radical having from 1 to 8 carbon atoms.

The specific curing agents included within the scope of the above formula are characterized by properties which permit storage without spontaneous polymerization since they can be produced in substantially pure form, i.e., a product having an azirane ring content of at least 85 percent, usually at least 95 percent, of theoretical.

Among the N,N'-bis-1,2-alkylenamides useful as curing agents in accordance with the invention are N,N'-bis-1,2-ethylenisosebacamide;
N,N'-bis-1,2-butylenisosebacamide;
N,N'-bis-1,2-ethylensebacamide;
N,N'-bis-1,2-ethylensuberamide;
N,N'-bis-1,2-propylensuberamide;
N,N'-bis-1,2-butylensuberamide;
N,N'-bis-1,2-ethylenazelaämide;
N,N'-bis-1,2-propylenazelaämide;
N,N'-bis-1,2-butylenazelaämide;
N,N'-bis-1,2-ethylendodecanoyldicarboxylic acid amide;
N,N'-bis-1,2-ethylentetradecanoyldicarboxylic acid amide;
N,N'-bis-1,2-propylentetradecanoyldicarboxylic acid amide;
N,N'-bis-1,2-ethylenhexadecanoyldicarboxylic acid amide;
N,N'-bis-1,2-ethylenoctadecanoyldicarboxylic acid amide;
N,N'-bis-1,2-propylenoctadecanoyldicarboxylic acid amide;
N,N'-bis-1,2-propylendodecanoyldicarboxylic acid amide; and
N,N'-bis-1,2-pentylensebacamide;
N,N'-bis-1,2-ethylenisophthalamide;
N,N'-bis-1,2-butylenisophthalamide;
N,N'-bis-1,2-propylenisophthalamide;
N,N'-bis-1,2-pentylenisophthalamide;
N,N'-bis-1,2-ethylenterephthalamide;
N,N'-bis-1,2-propylenterephthalamide;
N,N'-bis-1,2-butylenterephthalamide; etc.

Mixtures of these monmers may be produced by employing mixed N-1,2-alkylenimines in producing the monomers of the invention in accordance with the process of the invention.

The N,N'-bis-1,2-alkylenamide curing agents are prepared in monomeric form by the following process: a 1,2-alkylenimine, desirably containing not more than 6 carbon atoms, such as ethylenimine, N-1,2-propylenimine, N-1,2-butylenimine, N-1,2-pentylenimine, etc., is reacted with an aliphatic dicarboxylic acid chloride containing 8 to 20 carbon atoms, (e.g. isosebacoyl dichloride, sebacoyl dichloride, suberoyl dichloride, azelaoyl dichloride, tetradecanoyl dichloride, dodecanoyl dichloride, hexadecanoyl dichloride and octadecanoyl dichloride), isophthaloyl dichloride or terephthaloyl dichloride; to produce the desired substantially pure N,N'-bis-1,2-alkylenamide monomer, with hydrogen chloride as a by-product. The 1,2-alkylenimine is employed in a ratio of about 2 moles for each mol of acid chloride. Advantageously, an excess of 1,2-alkylenimine, such as about 5 percent by weight, over and above this ratio may be employed, although an excess of up to about 25 percent may be employed.

Desirably, the N-1,2-alkylenimine is introduced in an aqueous solution which also contains an alkali-metal carbonate, such as sodium, potassium, or lithium carbonate, which acts as an acid-acceptor to neutralize the hydrogen chloride formed during the reaction of the process. When a higher N-1,2-alkylenimine than N-1,2-ethylenimine, i.e., one containing more than 2 carbon atoms, is employed, an alkali-metal bicarbonate, such as sodium, potassium, or lithium bicarbonate may be used as the acid-acceptor instead of a carbonate. This aqueous solution is intimately mixed with the carboxylic acid chloride dissolved in a substantially water immiscible organic solvent which is chemically inert to both the reactants and the reaction products and in which the resulting N,N'-bis-1,2-alkylenamide is soluble. The N,N'-bis-1,2-alkylenamide monomer reaction product is then recovered in a relatively pure, stable state in high yield from the organic solvent, in which it collects as the reaction proceeds, by evaporating the solvent. By this process of producing the monomers any possibility of attack on and decomposition of the alkylenamide product by hydrogen chloride formed during the course of the reaction is effectively minimized.

It has been discovered that in producing N,N'-bis-1,2-alkylenamides of 1,2-ethylenimine according to the invention, pH control of the reaction mixture is more critical than where alkylenimines containing more than 2 carbon atoms are employed. Thus in such cases it is important to employ an alkali-metal carbonate as the acid-acceptor in an amount sufficient to neutralize all of the hydrochloric acid formed during the reaction of the process and yet maintain the pH of the reaction mixture at about 8.5 or above. With 1,2-alkylenimines containing more than 2 carbon atoms, on the other hand, an alkali-metal bicarbonate may be employed instead of an alkali-metal carbonate as the acid-acceptor, so long as sufficient bicarbonate is present to neutralize all of the hydrochloric acid formed. This phenomenon is believed to be the consequence of the greater reactivity of ethylenimine when compared to those alkylenimines containing more than 2 carbon atoms. The prevention of decomposition of the poly-N-alkylenamide monomer by the hydrogen chloride formed during the process which this process provides is critical to the production of stable monomer product in useful amounts.

In the preparation of the cured compositions of the invention, the polycarboxyl group containing prepolymers are employed in liquid form, and if necessary may be warmed slightly to liquefy them. To the selected liquid polycarboxyl prepolymer is then added the bis-amide curing agent which is to be employed. While an amount of the bis-amide which is equivalent stoichiometrically to the number of carboxyl groups present may be employed, and some curing effect can be obtained with even smaller amounts, full cures are effected when amounts greater than stoichiometric amounts are employed, ranging upwards from 10 to 100 percent greater; and it is ordinarily preferred that about 20 to 40 percent excesses of the theoretical stoichiometric equivalent of the curing agent be used in order to compensate for any inerts in the curing agent, its adsorption on and reactivity with fillers, etc. The cure is initiated as soon as the two components are mixed. The rate of cure is dependent to a degree upon the temperature, the viscosity of the mixture and the amount of the curing agent which is employed. Obviously, by maintaining the mixture at low temperatures, for example, about 0–10° C., the polymerization is retarded and increased pot life is obtained.

If desired, fillers can be added to the composition before curing, as well as dyes or other substances which may be considered as adjuvants and the like; for example, accelerators, antioxidants and catalysts. The finer fillers are good reinforcing agents for these systems, neutral fillers such as calcium carbonate, iron oxide and titanium dioxide being preferred. Acidic fillers such as certain carbon blacks and silicas can also be used if proper adjustments are made for pH (e.g. addition of increased amounts of bis-amide curing agent).

In order more clearly to disclose the nature of the present invention, a number of specific products and compositions in accordance with the invention will now be described. It should be understood, however, that this is done solely by way of illustration and is intended neither to delineate the scope of the invention nor limit the ambit of the appended claims. All parts are by weight unless otherwise specified.

PREPARATION OF BIS-AMIDE CURING AGENTS

A. Preparation of N,N'-bis-1,2--ethylenisosebacamide:

A solution of about 95.6 parts of isosebacoyl dichloride prepared from "isosebacic acid" (a product of the U.S. Industrial Chemical Company consisting of 72–80% of 2-ethylsuberic acid, 12–18% of 2,5-diethyladipic acid and 6–10% of n-sebacic acid) dissolved in 400 parts of diethyl ether is added dropwise with cooling and vigorous stirring to a flask containing a solution of 110 parts of potassium carbonate and 43 parts of ethylenimine in 800 parts of water. The temperature of the mixture is maintained below 15° C. and the acid chloride is added at a rate of approximately one part per minute. The reaction mixture is allowed to warm gradually to room temperature, while stirring, for an additional hour. During the total reaction period, the pH of the reaction mixture has dropped from approximately 12.5 at the beginning of the reaction to about 8.6 at the end. The ether layer is separated, dried over solid anhydrous sodium hydroxide at 0° C. for 1 hour, the sodium hydroxide is removed by filtration and the ether removed from the filtrate under reduced pressure. The resulting reaction product, N,N'-bis-1,2-ethylenisosebacamide, remains as a water-white liquid. The yield is 93% of theoretical. When subjected to analysis, the product is found to contain 10.8% nitrogen and 33.3% azirane radical as compared with the calculated values of 11.1% and 33.3%, respectively.

B. Preparation of N,N'-bis-1,2-butylenisosebacamide:

To a reaction flask equipped with a stirrer, thermometer, condenser and dropping funnel is charged a solution of about 55.2 parts of potassium carbonate and 15.8 parts of 1,2-butylenimine in 200 parts of water. The solution is stirred and cooled to about 4° C. To the cooled solution is then added dropwise, with stirring and cooling, over a period of about 23 minutes, a solution of about 23.9 parts of isosebacoyl chloride dissolved in about 72 parts of diethyl ether. During the addition, the temperature of the reaction mixture is maintained at about 4–8° C. After the addition is completed, the mixture is allowed to warm gradually to room temperature (21° C.) and stirring is continued for about 12 hours. During the course of the reaction the pH falls from pH 12.5 at the beginning to about pH 10.0 at the end. The ether layer is separated and dried by storing over anhydrous sodium hydroxide pellets for 1 hour at 0° C., the pellets are removed by filtration and the ether evaporated. The resulting N,N'-bis-1,2-butylenisosebacamide remains a water-white liquid. The yield is about 90% of theoretical. When subjected to analysis the N,N'-bis-1,2-butylenisosebacamide thus prepared was found to contain 0.6% chlorine and 43.1% 2-ethylazirane radical as compared with the calculated values of 0% and 45.5%, respectively.

It will be obvious that the curing agents employed herein are prepared by selecting the appropriate N-1,2-alkylenimine and dicarboxylic acid chloride, which are condensed by the procedures set forth above. In this way, the following compounds, which are further illustrative of the curing agents of the invention, are prepared, having the noted properties:

| Compound | M.P., ° C. | Appearance |
| --- | --- | --- |
| N,N'-bis-1,2-ethylensebacamide | 59.5–61 | White, crystalline solid |
| N,N'-bis-1,2-ethylenazelaamide | 44–46.5 | Do. |
| N,N'-bis-1,2-ethylendodecane-dicarboxylic acid amide. | 74–76 | Tan-colored solid. |
| N,N'-bis-1,2-propylensebacamide | 31.5–32.5 | White, crystalline solid. |
| N,N'-bis-1,2-propylenisosebacamide | | Water-white liquid. |
| N,N'-bis-1,2-ethylenisophthalamide | 76–78 | White, crystalline solid. |
| N,N'-bis-1,2-butylenisophthalamide | | Water-white viscous liquid. |
| N,N'-bis-1,2-propylenisophthalamide | | Water-white liquid. |
| N,N'-bis-1,2-ethylenterepthalamide | 140 | White, crystalline solid. |
| N,N'-bis-1,2-propylenterephthalamide | 96–108 | Do. |
| N,N'-bis-1,2-butylenterephthalamide | 98–110 | Do. |

In the same way, there are prepared the other poly-N-alkylenamides described hereinabove.

PREPARATION OF CARBOXYL GROUP CONTAINING PREPOLYMERS

Vinyl type copolymers

A. Preparation of a copolymer of methoxyethyl acrylate and acrylic acid:

About 25 parts of methoxyethyl acrylate, 0.25 part of acrylic acid, 0.50 part of tertiary dodecyl mercaptan and 0.10 part of tertiary butyl peroxide are sealed in a heavy-walled glass ampoule in the absence of air. The sealed ampoule is held at 100° C. (with agitation) for 20 hours. A liquid polymer is obtained which has an inherent viscosity in acetone of 0.11 and an acid number of 7.5.

B. Preparation of a copolymer of butadiene and acrylic acid:

About 90 parts by weight of butadiene, 10 parts of acrylic acid, 180 parts of water, 5 parts of sodium lauryl sulfate, 5 parts of sodium sulfate, one part of potassium persulfate, and 6 parts of commercial grade tertiary dodecyl mercaptan are charged into a heavy walled pressure vessel. The vessel is sealed, placed in a water bath at 55° C. and agitated for 18–20 hours at which time the polymerization is 75–80% complete. The unreacted butadiene is bled off and the latex is coagulated by the addition of a 5% solution of barium chloride. The coagulated polymer is washed by agitating it with a large amount of water, and then blended with 1½ parts of an antioxidant. The liquid polymer is dried by passing it over a hot drum drier. The product is a viscous liquid with an inherent viscosity of 0.19 and an acid number of 49.

The elastomer-producing compositions provided by admixture of the prepolymers and the curing agents included within the scope of the invention are generally speaking substantially liquid or viscous, semisolid substances, which can be compounded with fillers and the like to produce more or less viscous products. (By the term "substantially liquid" as used through the specification it is meant that the substance is capable of flowing and has a maximum viscosity of the order of about 10,000 poises at 25° C. Materials which approach this upper limit of viscosity may require warming to facilitate handling.) These uncured systems may be introduced into joints or spaces which are to be sealed, using the ordinary means available to the art, such as caulking guns and the like. The compositions undergo spontaneous curing, producing elastomers which provide effective sealing means. Alternatively it will be obvious that metal sheets or the like which are to be sealed can be coated with the elastomer producing compositions along lines of juncture, for example, on the abutting portions of lap joints, and then riveted, crimped together or otherwise joined, whereupon the elastomer produced on curing will seal the joint. Likewise, by employing materials of low viscosity or by employing solvents to reduce viscosity, the composition in which curing has been initiated can be utilized to coat surfaces, for example, interior surfaces of fuel tanks and the like, to seal the joints thereof and at the same time provide a substantially fuel-proof lining therefor. In another aspect of the invention, the elastomer producing compositions in uncured state, compounded if desired with pigments, fillers or the like, can be employed to coat fabrics. On curing, a tightly adherent continuous elastomeric film is formed which seals and protects the fabric. Such films are very flexible, even at very low temperatures, and are markedly abrasion resistant.

The prepolymers included within the scope of the invention are cured by the bis-amide curing agents primarily by chain extension, although crosslinking occurs where crosslinking sites are available in the prepolymer. Generally speaking, a slight amount of crosslinking is necessary in order to produce elastomers which exhibit substantially no cold flow.

The following examples illustrate the curing of the prepolymers of the invention with the curing agents specified herein, and the products thus obtained.

EXAMPLE I 17 grams of a 90:10 copolymer of butadiene and acrylic acid prepared according to the method of preparation B above and 3.4 grams of N,N'-bis-1,2-ethylenisosebacamide are mixed thoroughly and the mixture is poured into open polyethylene molds. After three days at room temperature a highly elastic but slightly tacky rubber has formed.

Evaluation

Original mechanical properties:
  Tensile Strength, p.s.i. _____ 130
  Elongation, percent _____ 100
  Set at Break, percent _____ 0
  Gehman $T_{10}$, ° C. _____ 46
  Brittle Point, $T_B$, ° F. below _____ 94

Mechanical properties after cure cycle of 70 hours at 250° F.:
  Tensile Strength, p.s.i. _____ 202
  Elongation, percent _____ 55
  Weight Loss, percent _____ 4

EXAMPLE II 60 parts by weight of a 90:10 low molecular weight copolymer of butadiene and acrylic acid (prepared according to the method of preparation B above) are dissolved in 40 parts by weight of a solvent consisting of 55% heptane, 25% isopropylacetate and 20% isopropanol. This solution is divided into three parts. To the first part is added 5% of N,N'-bis-1,2-ethylensebacamide (based upon the copolymer solids) and a film is cast from a portion of this solution. To the second part is added 10% of N,N'-bis-1,2-ethylensebacamide (based on the copolymer solids) and a film is also cast from a portion of this solution. The third part of the copolymer solution serves as a control and a portion of it is cast into a film without the addition of any curing agent.

The films are dried and their Constant Stress 10-Minute Moduli (as described by Dahlquist et al., Ind. Eng. Chem. 43, 1404 (1951) are measured. The moduli are found to increase in proportion to the amount of curing agent present. Both solutions which contain bis-amides are gelled after aging over night at room temperature while the control solution remains liquid.

EXAMPLE III 100 parts of a 90:10 copolymer of butadiene and acrylic acid (prepared by the method of preparation B above) and 13.35 parts of N,N'-bis-1,2-ethylenisophthalamide are mixed thoroughly and the mixture is poured into open polyethylene molds. After 2 days at room temperature a highly elastic but slightly tacky rubber has formed.

EXAMPLE IV 100 parts of the 99 to 1 copolymer of methoxyethyl acrylate and acrylic acid of preparation A above and 6 parts of N,N'-bis-1,2-ethylenisosebacamide are mixed thoroughly and the mixture is poured into open molds and allowed to cure for 28½ hours at 65° C. The resulting rubber has a Gehman $T_{10}$ temperature of −18° F. and a brittle point of from −25 to −29° F.

EXAMPLE V

About 100 parts of a 90:10 liquid copolymer of butadiene and acrylic acid similar to the copolymer of preparation B above and 8.5 parts of N,N'-bis-1,2-ethylenterephthalamide are mixed thoroughly with heating until solution is complete. The resulting liquid is cured for 10 minutes at 350° F., to from a soft, slightly tacky rubber.

EXAMPLE VI

About 100 parts of the 90:10 liquid copolymer of butadiene and acrylic acid of the previous example are mixed with 11 parts of N,N'-bis-1,2-butyleneter-ephthalamide until solution is complete. The resulting liquid is cured for 10 minutes at 350° F. to form a somewhat soft, tacky rubber.

EXAMPLE VII 17 parts of a terpolymer of butadiene, acrylonitrile and an acrylic-type acid (Hycar 1300 X-2, a product of B. F. Goodrich Company) and 4.25 parts of N,N'-bis-1,2-ethylenisosebacamide are mixed thoroughly and the mixture is poured onto open polyethylene molds. After 2 days at room temperature a soft rubber has formed.

*Evaluation*

Original mechanical properties:
  Gehman T$_{10}$, ° C. ------------------ −26
  Brittle Point, ° C. ------------------ −28 to −31
Percent volume swelling after 48 hours at 77° F. submerged in the following liquids:
  70% isooctane: 30% toluene -------------- 31
  Acetone --------------------------------- 137
Percent volume swelling after 70 hours at 212° F. submerged in the following liquids:
  Water ----------------------------------- 23
  ASTM reference oil No. 3 ---------------- 7

EXAMPLE VIII

Monomeric 5-cyano-3-thiapentyl acrylate is prepared as follows: The sodium derivative of 187.4 parts of 2-mercaptoethanol is reacted with 214.8 parts of beta-chloropropionitrile in the presence of 1000 parts of ethanol. The precipitate is then removed from the crude alkanol intermediate followed by vacuum distillation, the fraction boiling at 110–112° C. at a pressure of about 0.2 mm. of mercury being retained. The acrylate monomer is then prepared by adding dropwise a solution of 143.2 parts of freshly distilled acrylyl chloride, dissolved in about twice its volume of benzene, to a cooled flask containing 196.8 parts of the clear colorless purified alkanol, 167 parts of triethylamine and approximately 1500 parts of benzene. After filtration, the filtrate is washed and dried followed by purification of the crude product through distillation at 0.5 mm. mercury pressure. About 214 grams of the colorless clear 5-cyano-3-thiapentyl acrylate boiling at 118–121° C. at about 0.5 mm. mercury pressure are recovered.

A 99 to 1 copolymer of 5-cyano-3-thiapentyl acrylate and acrylic acid is prepared according to the procedure of A above and 100 parts of this copolymer are mixed thoroughly with 6 parts of N,N'-bis-1,2-ethylen-isosebacamide and the mixture is poured into an open mold and allowed to cure at room temperature. After two days the mixture is essentially tack-free, and after seven days a soft markedly fuel-resistant rubber has formed.

*Evaluation*

Percent volume swelling after being submerged in the following liquid:
  Water—after being submerged                Percent
    70 hours at 212° F. ------------------ 27.7
  70% isooctane, 30% toluene—after being submerged 48 hours at 140° F. -------------- 4.5

The volume swelling data in the isooctane-toluene liquid is considerably better than data obtained with similarly treated polysulfide systems.

The terms and expressions which have been employed are used as terms of description and not of limitation, and it is not intended, in the use of such terms and expressions, to exclude any equivalents of the feature shown and described or portions thereof, but it is recognized that various modifications are possible within the scope of the invention claimed.

Having described our invention, we claim:

1. A curable composition comprising an admixture of a vinyl copolymer containing on the average of more than 2 and not more than 15 carboxyl groups per molecule of an ethylenically unsaturated carboxylic acid or carboxylic anhydride comonomer and at least one other ethylenically unsaturated comonomer polymerizable therewith, said vinyl copolymer being substantially liquid at a temperature of about 25 to about 50° C., having an acid content in the range of about 0.1 and about 3 milli-equivalents per gram and having a molecular weight not higher than about 10,000, and at least a stoichiometric equivalent of a poly-N-alkylenamide as a curing agent of the formula:

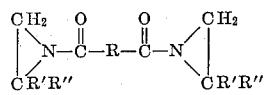

in which R is an organic radical, and R' and R" are hydrogen or an alkyl radical having from 1 to 8 carbon atoms.

2. A curable composition comprising an admixture of a vinyl copolymer containing on the average of more than 2 and not more than 15 carboxyl groups per molecule of an ethylenically unsaturated carboxylic acid or carboxylic anhydride comonomer and at least one other ethylenically unsaturated comonomer polymerizable therewith, said vinyl copolymer being substantially liquid at a temperature of about 25 to about 50° C., having an acid content in the range of about 0.1 and about 3 milli-equivalents per gram and having a molecular weight not higher than about 10,000 and at least a stoichiometric equivalent of an N,N'-bis-1,2-alkylenamide as a curing agent of the formula:

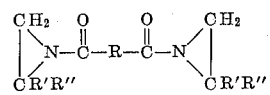

in which R is an organic radical selected from the group consisting of an alkylene radical having from 4 to 40 carbon atoms, a 1,3-phenylene radical and a 1,4-phenylene radical, and R' and R" are hydrogen or an alkyl radical having from 1 to 8 carbon atoms.

3. The composition of claim 2 in which the comonomer other than the carboxylic acid or carboxylic anhydride is a diene.

4. The composition of claim 2 in which the comonomer other than the carboxylic acid or carboxylic anhydride is an acrylate.

5. A process for curing a carboxyl containing polymer which comprises admixing a vinyl copolymer containing on the average of more than 2 and not more than 15 carboxyl groups per molecule of an ethylenically unsaturated carboxylic acid or carboxylic anhydride comonomer and at least one other ethylenically unsaturated comonomer polymerizable therewith, said vinyl copolymer being substantially liquid at a temperature of about 25 to about 50° C., having an acid content in the range of about 0.1 and about 3 milli-equivalents per gram and having a molecular weight not higher than about 10,000, with at least a stoichiometric equivalent of a poly-N-alkylenamide as a curing agent of the formula:

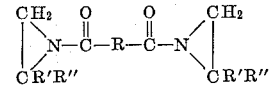

in which R is an organic radical, and R' and R" are hydrogen or an alkyl radical having from 1 to 8 carbon atoms, and curing the mixture at a temperature above 10° C.

6. A process for curing a carboxyl containing polymer which comprises admixing a vinyl copolymer containing on the average of more than 2 and not more than 15 carboxyl groups per molecule of an ethylenically unsaturated carboxylic acid or carboxylic anhydride comonomer and at least one other ethylenically unsaturated comonomer polymerizable therewith, said vinyl copolymer being substantially liquid at a temperature of about 25 to about 50° C., having an acid content in the range of about 0.1 and about 3 milli-equivalents per gram and having a molecular weight not higher than about 10,000, with at least a stoichiometric equivalent of an N,N'-bis-1,2-alkylenamide as a curing agent of the formula:

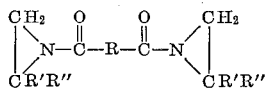

in which R is an organic radical selected from the group consisting of an alkylene radical having from 4 to 40 carbon atoms, a 1,3-phenylene radical and a 1,4-phenylene radical, and R' and R" are hydrogen or an alkyl radical having from 1 to 8 carbon atoms, and curing the mixture at a temperature above 10° C.

7. A cured composition comprising in its uncured form a vinyl copolymer containing on the average of more than 2 and not more than 15 carboxyl groups per molecule of an ethylenically unsaturated carboxylic acid or carboxylic anhydride comonomer and at least one other ethylenically unsaturated comonomer polymerizable therewith, said vinyl copolymer being substantially liquid at a temperature of about 25 to about 50° C., having an acid content in the range of about 0.1 and about 3 milli-equivalents per gram and having a molecular weight not higher than about 10,000, cured with at least a stoichiometric equivalent of a poly-N-alkylenamide of the formula:

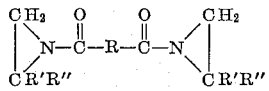

in which R is an organic radical, and R' and R" are hydrogen or an alkyl radical having from 1 to 8 carbon atoms.

8. A cured composition comprising in its uncured form a vinyl copolymer containing on the average of more than 2 and not more than 15 carboxyl groups per molecule of an ethylenically unsaturated carboxylic acid or carboxylic anhydride comonomer and at least one other ethylenically unsaturated comonomer polymerizable therewith, said vinyl copolymer being substantially liquid at a temperature of about 25 to about 50° C., having an acid content in the range of about 0.1 and about 3 milli-equivalents per gram and having a molecular weight not higher than about 10,000, cured with at least a stoichiometric equivalent of an N,N'-bis-1,2-alkylenamide of the formula:

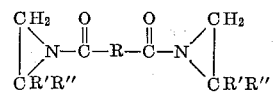

in which R is an organic radical selected from the group consisting of an alkylene radical having from 4 to 40 carbon atoms, a 1,3-phenylene radical and a 1,4-phenylene radical, and R' and R" are hydrogen or an alkyl radical having from 1 to 8 carbon atoms.

References Cited by the Examiner
UNITED STATES PATENTS

| | | | |
|---|---|---|---|
| 2,937,164 | 5/1960 | Brown et al. | 260—82.1 |
| 2,947,733 | 8/1960 | Werner et al. | 260—82.1 |
| 3,182,040 | 5/1965 | Watkins | 260—83.5 |

JOSEPH L. SCHOFER, *Primary Examiner.*

H. WONG, *Assistant Examiner.*